United States Patent [19]

Park

[11] Patent Number: 4,822,147

[45] Date of Patent: Apr. 18, 1989

[54] CONTRAST ENHANCEMENT OF OPTICAL IMAGES WITH NONLINEAR MEDIA

[75] Inventor: Yong K. Park, Vadnais Heights, Minn.

[73] Assignee: Honeywell Inc., Minneapolis, Minn.

[21] Appl. No.: 802,948

[22] Filed: Nov. 27, 1985

Related U.S. Application Data

[63] Continuation of Ser. No. 538,401, Oct. 3, 1983, abandoned.

[51] Int. Cl.$^4$ ................................................ G02F 1/17
[52] U.S. Cl. ................................. 350/354; 350/393; 350/397; 350/404
[58] Field of Search ............... 350/354, 363, 393, 353, 350/351, 166, 397, 404; 358/236

[56] References Cited

U.S. PATENT DOCUMENTS

| | | | |
|---|---|---|---|
| 3,085,469 | 4/1963 | Carlson | 350/393 |
| 3,266,370 | 8/1966 | Marks et al. | |
| 3,418,599 | 12/1968 | Soffer | |
| 3,469,107 | 9/1969 | Townes et al. | |
| 3,471,217 | 10/1969 | Wright | |
| 3,517,983 | 6/1970 | Fein et al. | 350/354 |
| 3,610,731 | 10/1971 | Seidel | 350/354 |
| 3,655,266 | 4/1972 | Buchan | 350/393 |
| 3,735,140 | 5/1973 | Stimler | |
| 3,977,788 | 8/1976 | Moore | |
| 4,012,699 | 3/1977 | Gibbs et al. | 350/354 |
| 4,043,637 | 8/1977 | Hovey | |

OTHER PUBLICATIONS

Fleisher et al., "Radiation Controlled Radiation Gate", IBM Tech. Disc. Bull., 8-1963, p. 73.

Primary Examiner—John K. Corbin
Assistant Examiner—Martin Lerner
Attorney, Agent, or Firm—William T. Udseth; John G. Shudy, Jr.

[57] ABSTRACT

A nonlinear, saturable absorptive medium is employed in conjunction with optical bistable devices to filter background light, serve as a frequency filter and/or amplify transmitted light while retaining the spatial intensity profile of an optical image.

9 Claims, 1 Drawing Sheet

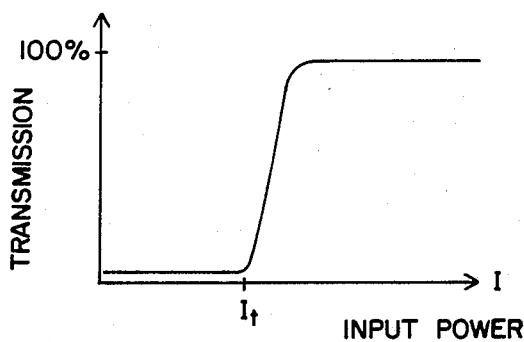
FIG. 1
(PRIOR ART)
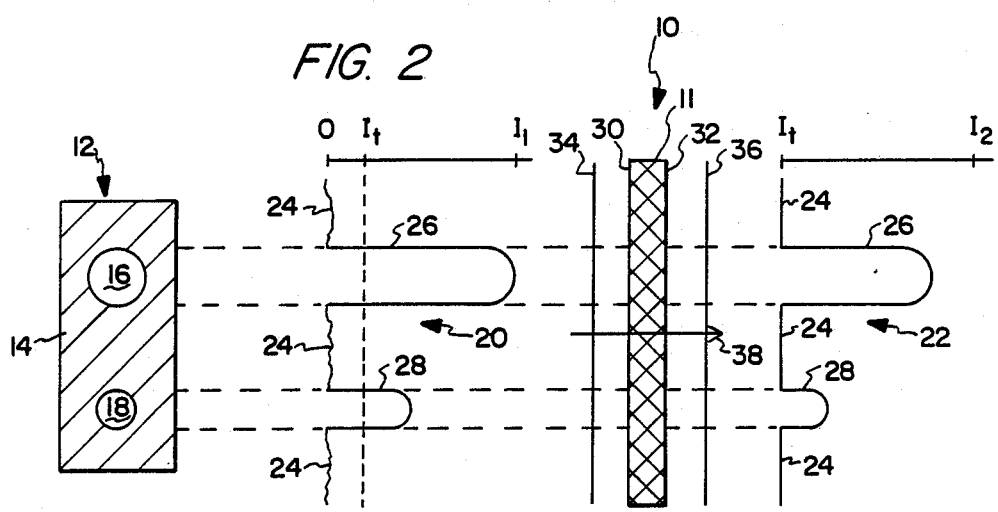
FIG. 2
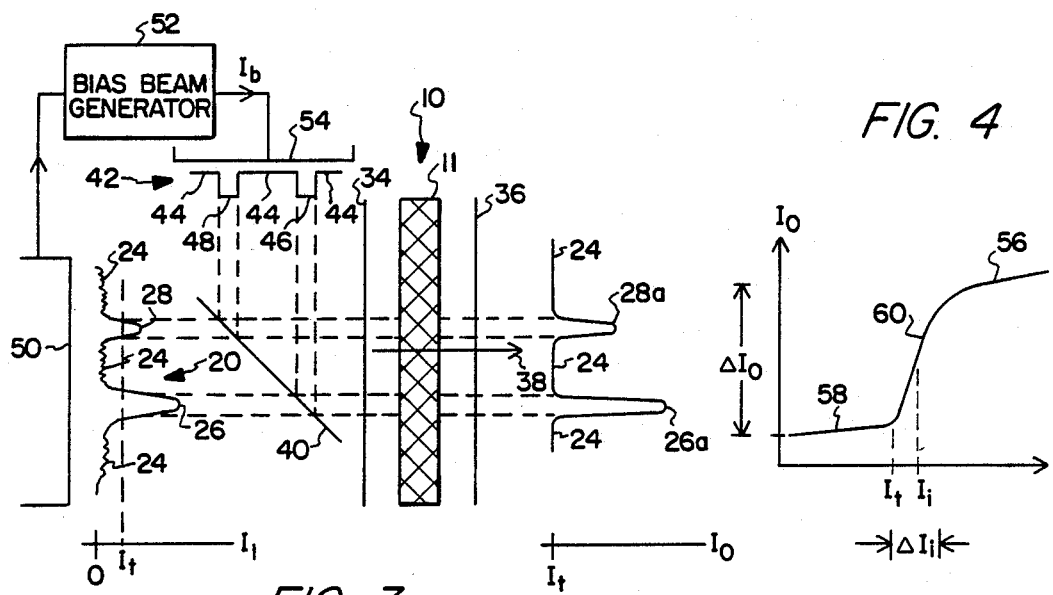
FIG. 3
FIG. 4

CONTRAST ENHANCEMENT OF OPTICAL IMAGES WITH NONLINEAR MEDIA

This application is a continuation of application Ser No. 538,401, filed Oct. 3, 1983, now abandoned.

BACKGROUND OF THE INVENTION

1. Field of the Invention

This invention relates to means and methods of employing a saturable absorptive nonlinear medium to provide contrast enhancement in optical images. Such medium are employed in optical bistable devices, such as a nonlinear Fabry-Perot resonator.

2. Prior Art

Optical image processing is typically performed with devices employing liquid crystal light valves or parallel processing of image data by conventional electronic methods. Many circumstances arise however where parallel processing by electronic means is impossible due to the necessity of opto-electrical and electro-optical conversion. Further, even when electronic parallel processing is involved, very complex systems are required for two dimensional optical images when real time processing is desirable. Additionally, devices employing liquid crystal light valves are too slow for real time processing.

It has been proposed to employ bistable optical devices utilizing nonlinear optical media (i.e., materials whose optical properties depend on the intensity of light passing through them) to form two dimensional arrays for optical image processing (see P. W. Smith and W. J. Tomlinson, "Bistable Optical Devices Promise Subpiocosecond Switching", *Advanced Technology-Solid State*, IEEE Spectrum, June 1981, pages 26–33). Experiments in this regard have been limited to employing hybrid devices (i.e., devices where the optical nonlinearity is not due solely to the intrinsic optical nonlinearity of a material), with liquid crystal light valves being used in one model.

SUMMARY OF THE INVENTION

The present invention is a device for enhancing contrast in an optical image, comprising: a nonlinear optical medium which will absorb light of selected wavelengths incident thereupon up to a threashold intensity and transmit light incident thereupon above the threshold intensity, and which is adapted to preserve the spatial intensity profile of the transmitted light.

The nonlinear medium is placed between two partially transmitting and partially reflecting means in one embodiment to provide an optical resonator which will also provide frequency filtering.

A further embodiment of the present invention combines a bias light beam with the optical image and inputs the combined beam to the optical resonator so that background light is filtered out and transmitted light is amplified.

BRIEF DESCRIPTION OF THE DRAWING

FIG. 1 is a graph of percent transmission as a function of the input power for a saturable absorptive nonlinear medium.

FIG. 2 is a schematic of the first embodiment of the present invention employing a saturable absorptive nonlinear medium.

FIG. 3 depicts a second embodiment of the present invention.

FIG. 4 is a graph of output intensity versus input intensity for the second embodiment of the present invention illustrating amplification.

DESCRIPTION OF THE PREFERRED EMBODIMENT

FIG. 1 shows the known characteristics of saturable absorptive materials such as $SF_6$ and $CS_2$. Below a certain threshold intensity $I_t$, transmission is almost zero since almost all photons (whose wavelength matches the transition resonance of the material) are being absorbed. However since the absorptive property is saturable, above intensity $I_t$ transmission rises dramatically and for a small change in intensity above $I_t$ transmission is virtually 100%. Some of the input will always be absorbed however in order to first saturate the absorptive medium.

The principle illustrated by the graph of FIG. 1 is employed advantageously in the present invention to provide contrast enhancement in optical images. FIG. 2 shows the first embodiment of the present invention.

In the present invention device 10 includes a nonlinear optical media such as medium 11 disposed in the path of an optical image 12. (As used herein "light" and "optical" may refer to any wavelength of the electromagnetic spectrum). Optical image 12 includes light of wavelengths at or near the transition resonance of medium 11. Optical image 12 includes a background portion 14 (shown by the diagonal lines) and, for illustrative purposes, two bright spots 16 and 18. FIG. 2 also shows two intensity profiles 20 and 22. Profile 20 depicts the intensity profile of image 12 prior to image 12 being transmitted through device 10 and profile 22 depicts the intensity profile of image 12 after image 12 is transmitted through device 10. Profile 20 includes three portions 24, 26 and 28. Portion 24 corresponds to the intensity of the background light 14. Portion 26 corresponds to the intensity of bright spot 16 and portion 28 corresponds to the intensity of bright spot 18. Profile 22 has the same three portions which are like numbered. For convenience, medium 11 is configured as a slab including two optically flat parallelly disposed surfaces 30 and 32.

Medium 11 is placed in an optical resonator cavity formed by partially reflecting and partially transmitting means 34 and 36. Means 34 and 36 are conveniently shown as flat plates but may be of various shapes (for example each may include an arcuate surface disposed in concave relationship to medium 11). Device 10 (which is formed by medium 11 and means 34 and 36) thus forms a Fabry-Perot filter. It is known that if the length of the resonating cavity times the index of refraction equals an integral number of half wavelengths of the incident light, constructive interference will occur and a powerful output will be produced. In contrast, for wavelengths not satisfying this relationship, very little light will be transmitted through device 10. This resonating phenomenon thus provides frequency filtering in addition to the contrast enhancement described below. This frequency filtering can be conveniently employed to allow transmission by device 10 of only wavelengths within image 12 at or near the transition resonance of medium 11.

In operation the invention of FIG. 2 is adapted so that light from optical image 12 strikes means 34 at a substantially normal angle (within the acceptance angle) of incidence at all points across the wave front. In the example of FIG. 2, image 12 is assumed to propogate as a plane wave and the direction of propogation of image 12 shown by arrow 38 forms a right angle with means 34. For the case of a plane wave, it is most convenient to provide means 34 and 36 as flat surfaces, and with substantially normal incidence, the spatial intensity profile of optical image 12 will be directly preserved as image 12 is transmitted through media 10.

Means 34 could be itself configured (or employed in conjunction with means (not shown), such as a lens, to refract all or a portion of image 12) so that substantially normal incidence across the entire wave front is provided on a surface of means 34. Depending on desires and applications, further means (not shown) could be provided to reform the wave front of image 12 after passing through device 10 so that the spatial intensity profile 20 is not altered. Further, device 10 could alter the spatial intensity profile 20 as long as a means (not shown) is provided to record the alteration and generate a reconstructed spatial profile after image 12 has interacted with device 10.

As profile 22 shows, all the background light 14 has been filtered out. This is because the intensity of the background light 14 was below $I_t$ and device 10 was adapted to filter out wavelengths other than those which could be absorbed by medium 11 (or image 12 could include only wavelengths of light which could be absorbed by medium 11). In addition, peaks 26 and 28 have been slightly reduced however the spatial intensity profile has been preserved and peaks 26 and 28 appear in sharp contrast to a uniform background 24.

FIG. 3 includes a further embodiment of the present invention. Therein the intensity of light input ($I_i$) to device 10 is the sum of the intensity of image 12 (i.e. $I_1$) plus the intensity of a bias or control beam ($I_b$). The bias beam intensity $I_b$ is added to $I_1$ by means 40. Means 40 can be, for example, a glass plate silvered on one side (e.g. partial reflector) so that image 12 is transmitted and the bias beam is reflected along direction 38.

Intensity profile 42 can be uniform or can vary depending upon the desired application. For example, the intensity profile 42 of $I_b$ may be uniform if it is known that by adding $I_b$ to image 12, the intensity of background regions 24 will remain below $I_t$.

On the other hand, it may be preferable to shape profile 42 so that $I_b$ is zero at all regions 44 corresponding to background region 24, and nonzero at regions 46 and 48 corresponding to bright regions 16 and 18, respectively. Note that peaks 46 and 48 need not be of the same height. If, for example, peak 28 were below $I_t$, peak 48 could be higher than peak 46 to compensate for weak spot 18 which generated peak 28.

Shaping of profile 42 can be accomplished directly when $I_b$ is generated if the spatial intensity profile 20 of image 12 is known in advance. If profile 20 is initially unkown, a sensor 50 could transmit spatial intensity information to bias beam generator 52 which could in turn generate profile 42 across image generator 54.

FIG. 4 displays a possible known output (i.e., substantially a step function) for an optical bistable device such as resonator device 10 including a nonlinear medium 11. High and low transmission conditions with corresponding regions 56 and 58 of relatively constant intensity, are known to be provided by such bistable devices. The transition region 60 between regions 56 and 58 is sharply sloped and therefore if $I_i$ is chosen to intersect a plot of output intensity $I_o$ in the transition region 60, slight variations (i.e., $\Delta I_i$) of the input intensity will cause relatively large variations (i.e., $\Delta I_o$) of the output intensity. Since $I_l$ and $I_b$ are summed in the device of FIG. 3, true amplification occurs, whether $I_l$ is constant (dc amplification) or fluctuates (ac amplification). Thus the device of FIG. 3 will not only filter out background light but will amplify the transmitted portion of image 12. This amplified feature is shown as peaks 26a and 28a in FIG. 3.

Of particular advantage in image processing is the fact that medium 11 can be configured of cross sectional dimensions which are coextensive with the entire area of device 10 to be illuminated by image 12. In other words, arrays are no longer necessary and instead the area covered by the array will simply be replaced by a section of medium 11. Further, solids with appropriate cross sectional dimensions can simply be coated or impregnated with medium 11 and substituted for former two dimensional arrays.

What is claimed is:

1. A device for enhancing contrast in a two dimensional optical image, said device comprising:
   means for producing said image, wherein said image includes selected wavelengths of light and a plurality of features;
   a nonlinear optical medium which will absorb light of said selected wavelengths incident thereupon having an intensity less than a threshold intensity and transmit light incident thereupon having an intensity above said threshold, and wherein the intensity of at least one of said features is less than said threshold intensity; and
   first and second means for partially transmitting and partially reflecting light, positioned in spaced relationship with respect to each other, with said nonlinear medium placed, at least in part, therebetween, and wherein said first and second means for partially transmitting and partially reflecting light and said nonlinear optical medium are adapted to only transmit light of said selected wavelengths which is incident upon said first means for partially transmitting and partially reflecting light.

2. The device of claim 1 wherein said first and second means for partially transmitting and partially reflecting light, and said nonlinear optical medium, are adpated to preserve the spatial intensity profile of that portion of said optical image which is transmitted through said second means for partially transmitting and partially reflecting light.

3. The device of claim 1 further including:
   a bias light source; and
   means for adding the intensity of said bias light source to the intensity of said optical image, said intensity adding means being positioned so that said optical image irradiates said intensity adding means before irradiating said first means for partially transmitting and partially reflecting light.

4. The device of claim 3 wherein said bias light source has a substantially uniform spatial intensity profile.

5. The device of claim 3 wherein said bias light source has a variable spatial intensity profile.

6. The device of claim 3 wherein:
   said first and second means for partially transmitting and partially reflecting light, and said nonlinear optical media are adapted to produce an output intensity of transmitted light which is substantially a step function of the intensity of said optical image, said step function having a transition region; and said bias light source has a spatial intensity profile such that the sum of the intensity of said bias light source and the intensity of said optical image at all points within said optical image having an intensity greater than said threshold intensity, lies within said transition region.

7. An optical device for affecting an optical image with a bias light beam, comprising:
   means for producing said image, wherein said image includes selected wavelengths of light and a plurality of features;
   a nonlinear optical medium which will absorb light of said selected wavelengths which is incident thereupon having an intensity less than a threshold intensity, and transmit light incident thereupon having an intensity above said threshold;
   first and second means for partially transmitting and partially reflecting light, positioned in spaced relationship with respect to each other, and with said nonlinear medium placed, at least in part, therebetween;
   means for adding the intensity of said bias light beam to the intensity of said optical image; and
   means for shaping the spatial intensity profile of said bias light beam such that the sum of the intensity of said bias light beam and the intensity of said optical image at all points within said optical image having an intensity greater than said threshold intensity, lies within a preselected range.

8. A method of enhancing contrast in a two dimensional optical image, said image including selected wavelengths of light and having a plurality of features, said method comprising:
   irradiating a saturable absorptive nonliinear medium with said image;
   absorbing light of said selected wavelengths having an intensity less than a threshold intensity, wherein the intensity of at least some of said features is less than said threshold intensity; and
   transmitting light of said selected wavelengths having an intensity above said threshold.

9. The method of claim 8 further including:
   filtering light from said image so that only said selected wavelengths are transmitted.

* * * * *